Patented June 28, 1938

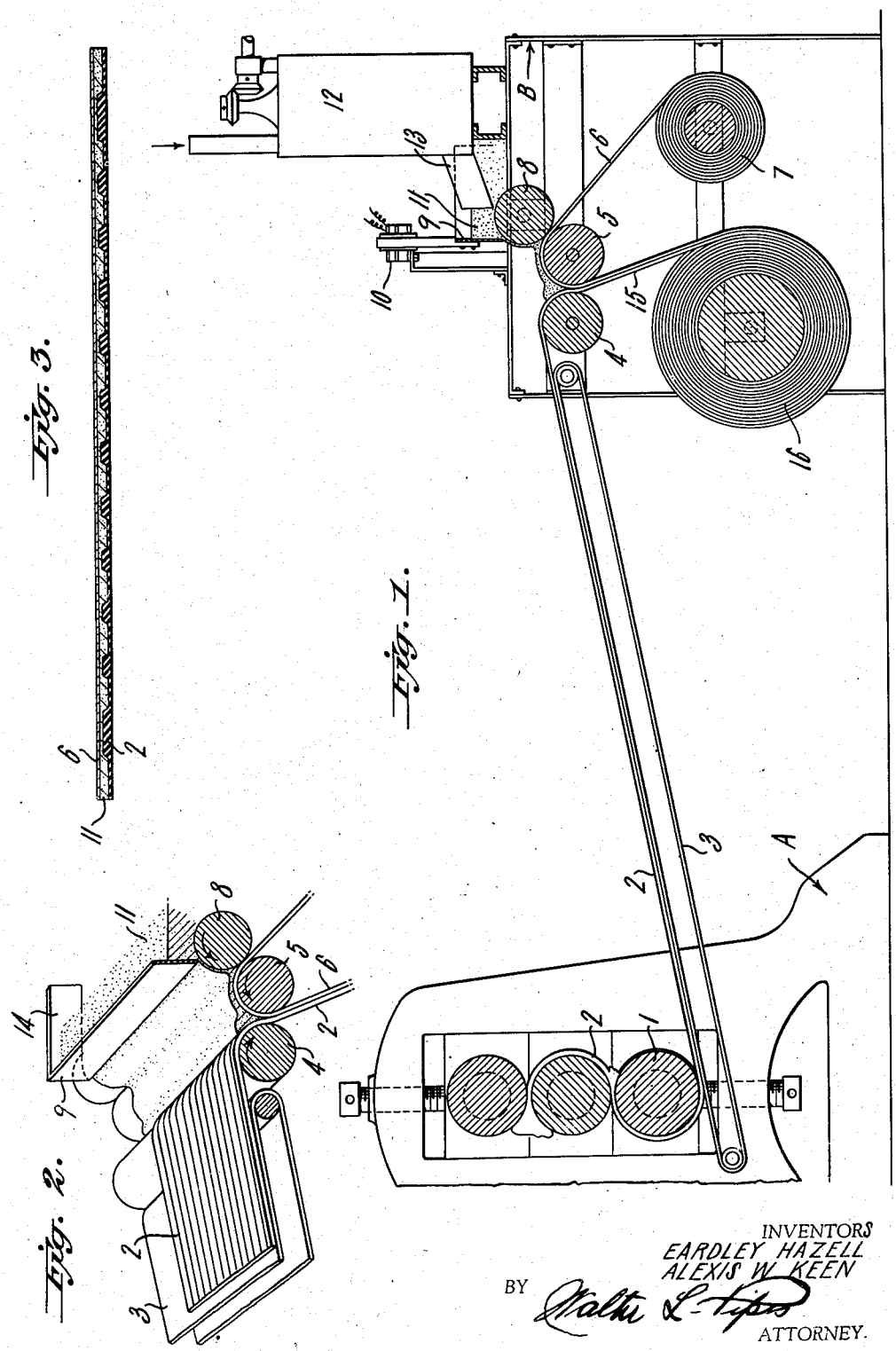

2,121,872

UNITED STATES PATENT OFFICE 2,121,872

MANUFACTURE OF ARTICLES FROM PLASTICS

Eardley Hazell, New York, N. Y., and Alexis W. Keen, Passaic, N. J., assignors to United States Rubber Products, Inc., New York, N. Y., a corporation of Delaware Application May 8, 1936, Serial No. 78,667

9 Claims. (Cl. 18—53)

This invention relates to the manufacture of articles from plastics of the kind that ordinarily require a setting or curing operation to harden them in some pre-determined form. More particularly the invention is concerned with an improved molding practice for heat-hardenable plastics whereby to accurately retain and maintain during the cure or setting operation the original sharpness of preformed surface detail.

One object of this invention is to provide an improved curing assembly including the preshaped article to be cured or set, by which preformed relief designs in the surface of the articles may be accurately preserved during the hardening operation without resort to expensive iron or steel molding equipment. Another object is to provide an inexpensive and effective method of preparing and hardening articles which ordinarily require confinement within a rigid mold for preservation of surface detail, particularly such articles made in sheet form and bearing patterned configurations in relief. A further object is to provide an improved method of producing ribbed microporous hard rubber battery plate separators. Other objects and advantages will be apparent from the following description.

The invention is particularly concerned with the handling of plastic rubber compositions and similar vulcanizable materials preparatory to vulcanization thereof, but may be adapted to other heat-hardenable plastics. The plastic material to be treated is first shaped into the finally desired patterned form by any suitable means such as molds, extrusion dies, embossing or profile calenders or otherwise. The design thus impressed into the article may include abrupt edges and relatively sharply raised and depressed surface areas in any desired pattern.

The curing assembly is made by associating the preshaped uncured or unset article with a temporary filling and coating of a wet plastic or mud of the physical nature of a stiff clay paste, so that the valleys or depressed areas of the design are filled up and the article coated with the wet plastic. The paste is made by uniformly mixing with an aqueous or non-aqueous liquid, in suitable proportions, any finely divided solid material such as clay, chalk, whiting, infusorial earth or the like which is insoluble in the liquid vehicle. The liquid vehicle may, for example, be water or other liquid chemically inert to the plastic. The paste is of such consistency that it can readily be spread or rolled onto the embossed surface before the cure and be removed by strong washing after the curing operation. If desired, the temporary filling material may thereafter be recovered and used over again.

Where the uncured article is in sheet form, the sheet carrying the temporary filling and coating of paste may be rolled or plied up, either with or without a fabric liner interposed between successive convolutions or plies. The sheets may also be cured or set flat, singly or superposed, between smooth platens, with or without application of pressure. The cure may be carried out in air, steam, or in water heated to the curing temperature and according to the requirement called for by the particular article to be treated.

The invention is illustrated with reference to a preferred embodiment and in connection with the manufacture of microporous hard rubber separators such as are used in electric storage batteries. Such microporous separators are produced by subjecting to a submarine cure a calendered rubber composition permeated with water in association with a water retaining or attracting agent, for example, a hydrophilic substance.

In a preferred form the separators are ribbed on one side, that is, provided with longitudinal ridges or ribs, the surface of the other side being flat. The ridges may conveniently be produced by means of a profile calender having a smooth-surfaced roll and a grooved roll having a plurality of grooves of the desired depth, width, and spacing. A wet plastic such as clay paste is then spread or rolled in a thin layer onto the ribbed side of the sheet so as to fill up the valleys at least even with the highest relief portions and preferably covering the ribs as well, forming a flat even coating over the entire area of the sheet. This operation may be carried out before, while, or after the sheet is run onto a fabric liner backing, or the liner backing can be omitted. The paste-filled and coated sheet is then plied up on a drum to a thickness consistent with a good distribution of heat during cure. The roll assembly is submerged in water and heated therein at a temperature well below the vulcanizing temperature of the compound in order to promote swelling of the rubber compound aided by abstraction of water from the clay paste. The temperature is then raised to vulcanizing temperatures to cure the sheet and cause fixation of the microscopic pores. The sheet is then unwound, the temporary filling of clay stripped and washed off, and the cured ribbed sheet cut to suitable dimensions.

In the practice of the invention the clay paste serves two important functions. Being soft and plastic, the clay fills and conforms exactly to the shape of every depression in the rubber sheet, as described above, and thereafter serves as a temporary matrix, retaining and maintaining in the sheet during the subsequent operations the definition of contour imparted to the sheet by the grooved calender roll. The second function of the clay paste, in the production of microporous articles, is to serve as an additional source of water for absorption by the calendered sheet. By such absorption the sheet undergoes further swelling, while the clay paste shrinks, and the increase in volume of the sheet is substantially equal to the decrease in volume of the clay paste, wherefore there is substantially no net change in the volume of the assembly. Consequently the pressure on the sheet remains substantially constant during the swelling, with the result that uniform swelling and hence uniform porosity are obtained throughout the length of the sheet, regardless of the number of plies in the assembly.

It is evident that the amount of water absorbed by the sheet and hence the degree of swelling and the porosity of the finished cured sheet may be varied and controlled by varying the initial water content of the clay paste. Further control of the degree of swelling is effected by controlling the tension on the liner when the liner and the coated stock are rolled up on a drum. Of course, in the case of sheet materials impermeable to water the clay paste serves only as a matrix maintaining the definition of the pattern, and the submersion and pre-heating prior to vulcanization may be omitted.

It will be apparent from the above that by the process of this invention an easy, efficient and economical way has been devised for curing or setting sheeted or otherwise shaped plastics having preformed patterned areas comprising depressed and raised portions. The invention may broadly be applied to water permeable plastics as well as to water impermeable plastics. Other commercial articles than battery separator plates may be made, for example, flooring, tiling, floor mats, door mats, panelling etc. The invention may be applied to articles made from caoutchouc, gutta percha, balata, synthetic rubbers, rubber isomers, rubber substitutes, etc.

The temporary filling of wet plastic clay or material having like properties may be applied to the article manually or by various mechanical means. One such method proposed consists of passing the sheeted stock on a fabric liner over one of a pair of spaced, even-speed pinch rolls while another fabric liner or belt is passed around the opposite roll. Clay paste is applied in the bight of the rolls between the surface of the stock and the opposite liner, or the paste may be carried on the under side of a belt and transferred to the stock as they go through the rolls. In this way the mud or paste is forced uniformly into the depressions and over the edges of the stock and at the same time it is prevented from caking on the rolls and destroying the work.

Another proposed means is shown in Figs. 1–3 of the drawing wherein:

Fig. 1 is a side view of an apparatus adapted to calender the plastic sheet material and impart a ribbed profile thereto, together with an apparatus for applying a paste filling to the ribbed face of the sheet;

Fig. 2 is a view in perspective of the clay paste applying mechanism;

Fig. 3 is a cross sectional view of the composite sheet curing assembly.

A is a profile calender having a grooved rotating roll 1 suitably geared to the other calender rolls, constituting means for sheeting and creating relatively raised and depressed surface areas in the plastic stock 2. In the case of separators so previously treated, the lands and webs indicated in profile in Fig. 3 represent such areas. A conveyor belt 3, driven by any suitable means, is supported near roll 1 so as to directly receive and convey the rubber sheet 2 containing desired vulcanizing ingredients to the paste-applying apparatus B; alternatively, conveyor 3 may comprise two or more belts travelling at successively decreasing speeds in order to compensate for and control the natural shrinking of the calendered sheet. Shrinkage stresses may also, if desired, be removed by annealing the sheet in a bath of hot water or air interposed in the path of the sheet between A and B. Continuous transmission of the sheet from A to B, with proper control of shrinkage, permits accurate control of the dimensions of the sheet and further allows of successive operations on a continuous sheet with substantially no interruption from the time the stock is fed to the calender, resulting in uniformity and economy of production.

A pair of positively driven even speed rolls 4 and 5, which may be geared together, receive sheet 2 together with a liner 6. Rolls 4 and 5 are preferably driven by means of a variable speed drive so that their speed may be varied in accordance with the amount of shrinkage permitted in sheet 2. Liner 6 unwinds from a removable drum 7 and passes over the upper surface of roll 5 and down between rolls 4 and 5. An attenuator roll 8 is set against liner 6 and revolves in a direction opposed to the movement of 6. Roll 8 is geared to rolls 4 and 5, and may revolve at a greater surface speed than rolls 4 and 5 so as to give rise to a wiping action.

A doctor knife or blade 9 is suitably supported above roll 8 and may be vibrated by any desirable form of vibrator such as an electromagnetic vibrator 10. A clay paste 11 is uniformly mixed in a mixer 12 and delivered thru a valve or gateway 13 to the top surface of roll 8. Guides 14, one on each side of the doctor blade 9, which guides may be suitably attached to the doctor blade, are provided to confine and guide the movement of the paste. The rotating roll 8, revolving in the direction indicated, acts in conjunction with blade 9 to form an attenuated layer of the clay paste by dragging the slip to and under the edge of blade 9, which spreads the paste out thinly and evenly on the surface of roll 8 from which it is wiped in a layer of the desired thickness directly onto the moving liner 6. Vibration of the doctor blade prevents undue sticking of the paste to the blade and guides and also assists in bursting air bubbles.

The accumulated layer of paste on liner 6 is uniformly pressed into and over the ribbed face of the rubber sheet by the cooperation of rolls 4 and 5, sheet 2 and liner 6, and thus is formed the composite assembly 15 shown in detail in Fig. 3. A small bank of paste, controllable by adjustment of the clearance between knife 9 and roll 8, is allowed to accumulate in the bight of rolls 4 and 5 to insure a solid filling in of the valleys with the paste. Liner 6 is generally a fabric but may be made of any suitable material.

The assembly 15 is wound up under suitable tension on a removable drum 16, positively driven by any suitable means. The drum 16 and plied up uncured coated rubber sheet is then submerged in water,—preferably in the vulcanizer as a matter of convenience,—and heated therein, at a temperature well below the vulcanizing temperature of the stock and for a sufficient time to permit the abstraction of water by the rubber stock from the matrix to substantially reach equilibrium, concurrently with which the rubber sheet attains its maximum degree of swelling. The rubber is then cured under non-evaporative conditions by any convenient method such as by immersion in saturated steam or in heated water. When the final swelling treatment is carried out in the vulcanizer, the vulcanizing step is conveniently accomplished without transfer of the stock by raising the temperature of the water to a vulcanizing temperature. Thereafter the stock is unrolled and the clay is stripped or scraped and washed off from the cured rubber sheet.

As an alternative procedure, after the paste has been pressed onto the sheet 2 as above, the liner 6 may be stripped off and wound up on a separate drum, only the paste-coated rubber sheet being wound up on drum 16. The paste-coated sheet may also be cut to convenient lengths and curved flat, either singly or plied up in stacks, between smooth platens under light pressure.

It is important that the layer of clay paste 11 on liner 6 be sufficiently thin to allow elimination of air bubbles which are usually unavoidably incorporated during bulk mixing of such pastes. Although special air evacuation means may be applied to the paste, this additional expense is not necessary to the present set-up, since the mere smearing of the clay paste in a thin layer is found to remove air bubbles satisfactorily. Vibration of the knife blade 9 also assists in bursting the air bubbles. If not removed, these air bubbles would expand during the subsequent heating and pock the rubber surface to spoil the cured sheet.

The thickness of the layer of substantially air-free clay paste built up on liner 6, depends on the thickness of the paste layer spread by the knife 9, and on the ratio of the surface speed of roll 8 to that of liner 6; for example, a ratio of 4:1 has been found to be satisfactory. If a thinner layer is required to effectively burst substantially all air bubbles, the knife 9 is set to a smaller clearance and the surface speed of roll 8 relative to that of liner 6 must be further increased in order to provide sufficient paste for completely filling in the ribbed sheet 2.

The whole apparatus is operated with all moving parts suitably supported by upright standards or other form of support as will be apparent to those skilled in the art, and with such parts coordinating to allow a continuous shaping of the stock, filling up of the preformed design cavities with a layer of substantially air-free paste, and removal of the composite sheet from the zone of formation of the composite sheet.

It will be apparent that the apparatus may be used in applying other than clay paste. Any paste physically similar to clay may be used instead, other materials being, for example, pastes of chalk, whiting, infusorial earth and the like. The clay paste or other filling and coating material should have a degree of acidity which will not interfere with the proper curing of the rubber, preferably, the pH of the paste should be kept within the range from 5 to 10. The preformed sheet may be formed of a plastic other than a rubber, and the final article may be other than a battery plate separator, although the invention is especially adapted therefor. Examples of other articles, are flooring, tiling, door mats, floor mats, panelling, etc., whether of soft or hard rubber composition.

Having thus described our invention, what we claim and desire to protect by Letters Patent is:

1. A method of manufacturing from a heat-hardenable plastic stock articles having predetermined relief designs in the surface thereof which comprises forming such designs in the shaped stock and then at least filling the valleys with a paste or mud to form a temporary matrix, curing or setting the plastic while associated with said matrix and thereafter removing the temporary filling material.

2. A method of manufacturing a rubber article bearing relatively sharply depressed surface areas which comprises forming such areas and applying a paste of finely divided water-insoluble material to such areas to fill and cover over at least the valleys of the surface design, curing the rubber while in contiguous association with the paste, said paste acting as a temporary matrix to maintain the definition of the design, and thereafter removing the temporary filling.

3. A method of manufacturing microporous hard rubber battery plate separators having ribbed or corrugated self-reenforcements which comprises shaping a water permeated unvulcanized hard rubber composition into sheet form having such reenforcements, applying a coating of an aqueous paste to the ribbed or corrugated surfaces so as to fill the valleys and form an even surface over the sheet and confining the coated sheet so as to keep the coating intact during subsequent operations.

4. A method of manufacturing microporous hard rubber battery plate separators having ribbed or corrugated self-reenforcements which comprises shaping a water-permeated unvulcanized hard rubber composition into sheet form having such reenforcements, applying a coating of an aqueous paste to the ribbed or corrugated surfaces so as to fill the valleys and form an even surface over the sheet and confining the coated sheet by means of a fabric liner.

5. A method of manufacturing microporous rubber articles which comprises shaping a water-permeated plastic unvulcanized rubber composition in the form of an article, said composition being capable of swelling by further absorption of water, applying to the surface thereof a coating of substantial thickness of a paste of finely divided solid material in an aqueous vehicle capable of being absorbed by the rubber composition, and confining the coated article so as to keep the paste coating intact during subsequent operations.

6. A method of manufacturing microporous rubber articles which comprises shaping a water-permeated plastic unvulcanized rubber composition in the form of the article, said composition being capable of swelling by further absorption of water, applying to the surface thereof a coating of substantial thickness of a paste of finely divided solid material in an aqueous vehicle capable of being absorbed by the rubber composition, confining the coated article so as to keep the paste coating intact during subsequent operations, maintaining the assembly at a suitable temperature for a sufficient time to permit substantial absorption of water by the rubber composition from the paste coating, heating the assembly to a vulcanizing temperature to cure the rubber and cause fixation of the microscopic pores therein, and thereafter removing the paste coating from the cured microporous rubber article.

7. A method of manufacturing microporous rubber articles which comprises shaping a water-permeated plastic unvulcanized rubber composition in the form of the article, said composition being capable of swelling by further absorption of water, applying to the surface thereof a coating of substantial thickness of a paste of finely divided solid material in an aqueous vehicle capable of being absorbed by the rubber composition, confining the coated article so as to keep the paste coating intact during subsequent operations, heating the assembly to promote absorption of water by the rubber composition from the paste and vulcanizing the rubber under non-evaporative conditions, and thereafter removing the paste from the cured microporous rubber article.

8. A method of manufacturing microporous hard rubber battery plate separators having ribbed or corrugated self-reenforcements which comprises shaping a water-permeated unvulcanized hard rubber composition into sheet form having such reenforcements, applying a coating of an aqueous paste to the ribbed or corrugated surfaces so as to fill the valleys and form an even surface over the sheet, confining the coated sheet so as to keep the coating intact and plying up the sheet associated with the paste coating to form a composite curing assembly, submerging the assembly in water at a suitable temperature to promote further absorption of water by the rubber composition from the paste whereby to swell the rubber sheet, and vulcanizing the rubber under non-evaporative conditions to thereby cause fixation of the microscopic pores therein, and thereafter removing the paste coating.

9. A method of manufacturing microporous hard rubber battery plate separators which comprises shaping a water-permeated unvulcanized hard rubber composition into a ribbed sheet, applying a coating of clay paste to the ribbed face of the sheet so as to fill in the valleys and form an even surface over the sheet, superposing a fabric liner over the layer of clay paste, plying up the sheet associated with the clay coating and liner to form a composite curing assembly, submerging the assembly in water at a suitable temperature to promote further absorption of water by the rubber composition from the paste whereby to swell the rubber sheet, and vulcanizing the rubber under non-evaporative conditions to thereby cause fixation of the microscopic pores therein, and thereafter removing the paste coating.

EARDLEY HAZELL.
ALEXIS W. KEEN.